United States Patent
Crow et al.

(10) Patent No.: US 11,204,711 B2
(45) Date of Patent: Dec. 21, 2021

(54) METHOD AND SYSTEM FOR OPTIMIZING A HOST COMPUTING DEVICE POWER DOWN THROUGH OFFLOAD CAPABILITIES

(71) Applicant: EMC IP Holding Company LLC, Hopkinton, MA (US)

(72) Inventors: Preston F. Crow, Ashland, MA (US); Jonathan I. Krasner, Coventry, RI (US); Serge Joseph Pirotte, Coventry, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 133 days.

(21) Appl. No.: 16/670,669

(22) Filed: Oct. 31, 2019

(65) Prior Publication Data

US 2021/0132807 A1 May 6, 2021

(51) Int. Cl.
*G06F 3/06* (2006.01)
*G06F 1/30* (2006.01)
*G06F 1/26* (2006.01)

(52) U.S. Cl.
CPC .............. *G06F 3/065* (2013.01); *G06F 1/263* (2013.01); *G06F 1/30* (2013.01); *G06F 3/0619* (2013.01); *G06F 3/0683* (2013.01)

(58) Field of Classification Search
CPC .......... G06F 1/263; G06F 1/30; G06F 3/0619; G06F 3/0683
See application file for complete search history.

(56) References Cited

U.S. PATENT DOCUMENTS

| | | | |
|---|---|---|---|
| 7,035,954 B1* | 4/2006 | Duran | G06F 13/4081 710/301 |
| 7,284,119 B2 | 10/2007 | Hyder | |
| 7,656,894 B2 | 2/2010 | Dube | |
| 9,477,466 B2 | 10/2016 | Nishimoto | |
| 9,529,620 B1 | 12/2016 | Dow | |
| 10,216,681 B2* | 2/2019 | Ahmed | G06F 13/36 |
| 10,229,471 B2* | 3/2019 | Avkarogullari | G06F 1/3215 |
| 10,353,722 B2 | 7/2019 | Karino | |
| 2003/0084435 A1 | 5/2003 | Messer | |
| 2006/0098018 A1 | 5/2006 | Tarditi, Jr. | |
| 2011/0154334 A1 | 6/2011 | Beale | |
| 2012/0110346 A1 | 5/2012 | Resch | |
| 2014/0189039 A1 | 7/2014 | Dalton | |

(Continued)

*Primary Examiner* — Tammara R Peyton
(74) *Attorney, Agent, or Firm* — Chamberlain, Hrdlicka, White, Williams & Aughtry (57) ABSTRACT

In general, in one aspect, the invention relates to a method for processing data, the method includes obtaining, by a host operating system (OS) on a host computing device, a notification of a power down. The further includes, in response to the notification, performing a data storage analysis on data stored in host OS memory to identify a plurality of processing tasks to perform on the data, making a first determination, based on the data storage analysis, that data processing is to be offloaded to a graphics processing unit, and in response to the first determination: sending a data processing request to the processing unit, obtaining a second notification associated with processed data from the graphics processing unit, and storing the processed data in a backup storage device.

18 Claims, 4 Drawing Sheets

(56) References Cited

U.S. PATENT DOCUMENTS

| | | | |
|---|---|---|---|
| 2014/0230067 A1* | 8/2014 | Sahita | G06F 21/84 |
| | | | 726/26 |
| 2015/0154111 A1 | 6/2015 | Dabreu | |
| 2016/0164962 A1 | 6/2016 | Ghosh | |
| 2017/0085636 A1 | 3/2017 | Lin | |
| 2017/0289059 A1 | 10/2017 | Wu | |
| 2018/0046385 A1 | 2/2018 | Altaparmakov | |
| 2020/0334184 A1 | 10/2020 | Suresh | |

* cited by examiner

METHOD AND SYSTEM FOR OPTIMIZING A HOST COMPUTING DEVICE POWER DOWN THROUGH OFFLOAD CAPABILITIES

BACKGROUND

Computing devices may include any number of internal components such as processors, memory, and persistent storage. Each of the internal components of a computing device may be used to generate data. The process of generating and storing may utilize computing resources of the computing devices such as processing, storage, and power consumption. The utilization of the aforementioned computing resources to generate processed data may impact the overall performance of the computing resources.

SUMMARY

In general, in one aspect, the invention relates to a method for processing data, the method comprising: obtaining, by a host operating system (OS) on a host computing device, a notification of a power down; and in response to the notification: performing a data storage analysis on data stored in host OS memory to identify a plurality of processing tasks to perform on the data; making a first determination, based on the data storage analysis, that data processing is to be offloaded to a graphics processing unit; and in response to the first determination: sending a data processing request to the processing unit; obtaining a second notification associated with processed data from the graphics processing unit; and storing the processed data in a backup storage device.

In general, in one aspect, the invention relates to a non-transitory computer readable medium comprising computer readable program code, which when executed by a computer processor enables the computer processor to perform a method for processing data, the method comprising: obtaining, by a host operating system (OS) on a host computing device, a notification of a power down; and in response to the notification: performing a data storage analysis on data stored in host OS memory to identify a plurality of processing tasks to perform on the data; making a first determination, based on the data storage analysis, that a data processing is to be offloaded to a graphics processing unit; and in response to the first determination: sending a data processing request to the processing unit; obtaining a second notification associated with processed data from the graphics processing unit; and storing the processed data in a backup storage device.

In general, in one aspect, the invention relates to a system, comprising a processor; a plurality of graphics processing units; a host operating system (OS) executing on the processor; host OS memory; shared memory; and wherein the host operating system is programmed to: obtain a notification of a power down; and in response to the notification: perform a data storage analysis on data stored in the host OS memory to identify a plurality of processing tasks to perform on the data; make a first determination, based on the data storage analysis, that a data processing is to be offloaded to at least one of the plurality of graphics processing unit; and in response to the first determination: send a data processing request to the processing unit; obtain a second notification associated with processed data from the graphics processing unit; and store the processed data in a backup storage device, wherein the host OS memory comprises volatile memory, and wherein the backup storage device comprises non-volatile memory.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components, Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system optimizing a power-down of a host computing device. The power down may be optimized by offloading processing to one or more graphics processing units (GPUs) in order to minimize the time required to process data stored in volatile memory to decrease data loss during power down. Because the GPUs process data faster, the process of offloading the data processing to the GPUs reduces the time taken to perform the data processing.

Embodiments of the invention include performing a data storage analysis on the data that includes identifying characteristics of the data and determining one or more processing tasks that may be performed on the data, and prompting the GPUs to perform the processing in accordance with the processing tasks to generate processed data. The processed data may be stored in non-volatile storage.

Figure 1:
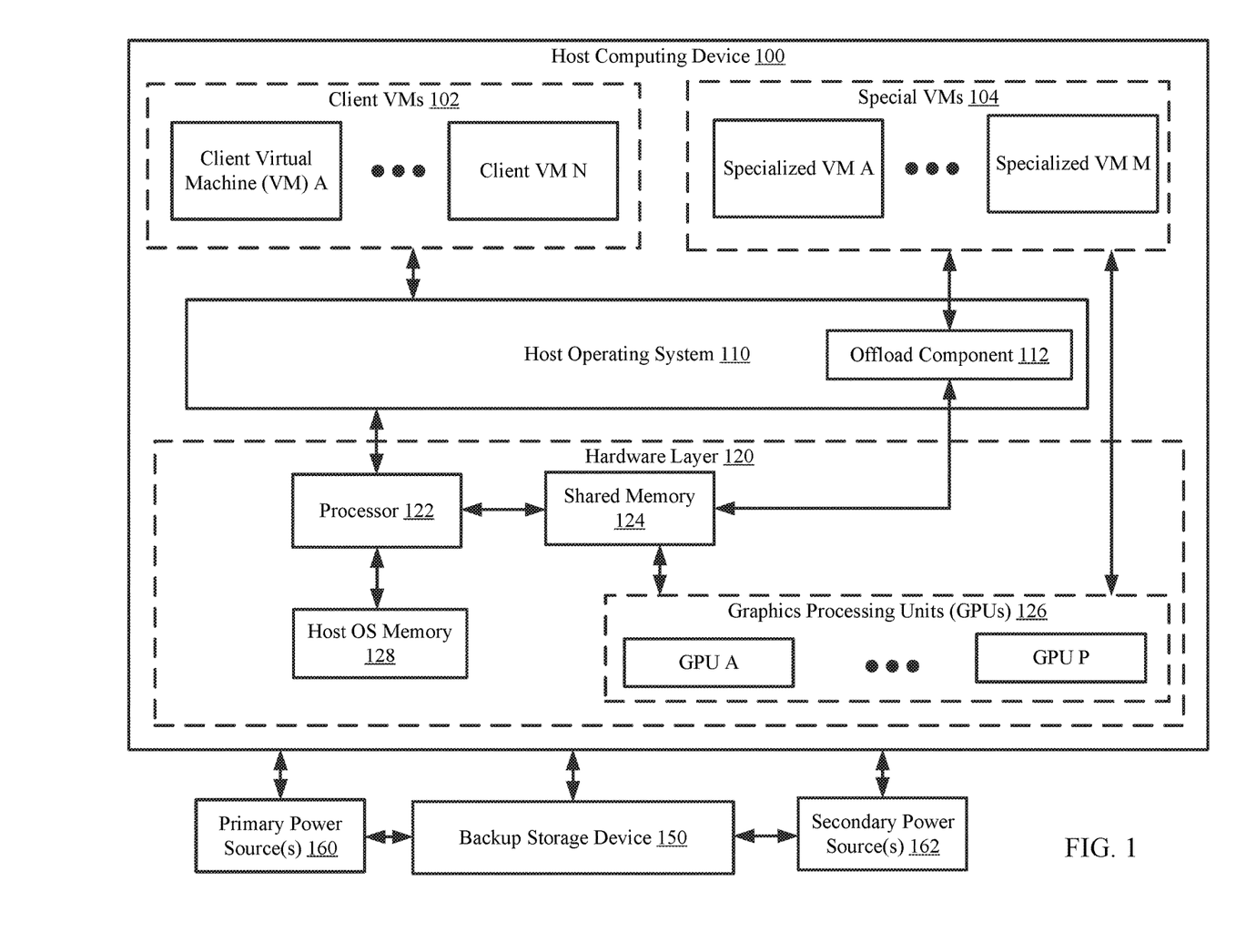
FIG. 1 shows a diagram of a system in accordance with one or more embodiments of the invention.

FIG. 1 shows an example system in accordance with one or more embodiments of the invention. The system includes a host computing device (100), a backup storage device (150), at least one primary power source (160), and at least one secondary power source (162). The system may include additional, fewer, and/or different components without departing from the invention. Each component may be operably connected via any combination of wired and/or wireless connections. Each component illustrated in FIG. 1 is discussed below.

In one or more embodiments of the invention, the host computing device (100) hosts any number of client virtual machines (VMs) (102). The client VMs (102) may be logical entities executed using computing resources (e.g., components of a hardware layer (120)) of the host computing device (100). Each of the virtual machines may be performing similar or different processes. In one or more embodiments of the invention, the virtual machines provide services to users, e.g., clients (not shown). For example, the virtual machines may host instances of databases, email servers, and/or other applications. The virtual machines may host other types of applications without departing from the invention.

In one or more embodiments of the invention, the host computing device (100) hosts specialized VMs (104) that include functionality for communicating with the offload component and/or directly with the GPUs (126). The specialized VMs (104) may perform the aforementioned functionality using components illustrated in the hardware layer (120). The specialized VMs (104) may interact with the components of the hardware layer (120) without using the host OS (110) using, for example, a peripheral component interconnect (PCI) pass-through. In one or more embodiments of the invention, the specialized VMs (104) each include their own operating system (OS) that allows the specialized VMs (104) to perform the aforementioned functionality. The OS operating on the specialized VMs (104) may be equipped to communicate with an offload component (112) of the host OS (110).

In one or more embodiments of the invention, instead of communicating directly with the GPUs, the specialized VMs (104) may communicate with the GPUs using a hypervisor (not shown). The hypervisor may be an entity that is interposed between the specialized VMs (104) and the offload component (112) of the host OS (110). Further, the hypervisor may be equipped to facilitate communication between the specialized VMs and the GPUs (126) and interface with the specialized VMs (104). Such that each of the specialized VMs (104) may communicate with the GPUs (126) through the hypervisor. Other protocols or communication mechanisms may be used without departing from the invention.

In one embodiment of the invention, the host computing device may include different types of GPUs, where each the different types of GPUs use different communication protocols and/or have different functionality. In this scenario, the host computing device may include different types of specialized VMs, each type of specialized VMs is able to interact with a specific type of GPU. In such scenarios, the different types of the specialized VMs may be optimized to work with particular types of GPUs. Further, if a new GPUs is added to the host computing device change, a new or modified specialized VM may be added to the host computing device such that the host computing device can utilize the new GPU.

In one embodiment of the invention, the specialized VMs include functionality to service offload requests in a manner that most efficiently utilizes the GPUs processing capabilities, such as parallel processing.

In one or more of embodiments of the invention, the virtual machines (102, 104) are implemented as computer instructions, e.g., computer code, stored on a persistent storage that when executed by a processor(s) (e.g., 122) of the host computing device (100) cause the host computing device (100) to provide the functionality of the virtual machines (102, 104) described throughout this application and/or all, or a portion thereof, of the methods illustrated in FIG. 2B.

In one or more embodiments of the invention, the hardware layer (120) includes computing resources utilized by components (e.g., the host OS (110), client VMs (102), the specialized VMs (104), and/or the offload component (112)) of the host computing device (100) to perform the functionalities specified by each respective component. The computing resources may include a processor(s) (122), host OS memory (128), shared memory (124), and one or more graphics processing units (GPUs) (126). Each computing resource of the hardware layer (120) may be operably connected via any combination of wired connections. Each computing resource of the hardware layer (120) is discussed below.

The processor (122) may be a computing resource that processes information (e.g., data) as requested by a component and sends the processed data to the requested entity. Processing data may include arithmetic calculations, logic processing, and/or other input/output operations without departing from the invention. In one or more embodiments of the invention, the processor (122) is implemented as a central processing unit (CPU) with single-core or multi-core processing capabilities. The processor (122) may be other types of processors without departing from the invention.

The host OS memory (128) is volatile memory that may be accessed by the host OS (110) via the processor (128). In one or more embodiments of the invention, the host OS memory (128) is implemented as, for example, static random access memory (SRAM), dynamic random access memory (DRAM), and/or other types of memory without departing from the invention.

The shared memory (124) is volatile memory that may be accessed by two or more components of the host computing device (100). In one or more embodiments of the invention, the shared memory (124) is implemented as, for example, static random access memory (SRAM), dynamic random access memory (DRAM), and/or other types of memory without departing from the invention.

In one or more embodiments of the invention, the host OS memory (128) and the shared memory (124) may be operatively connected via a PCI express (PCI-E) bus that facilitates data transfer between the additional memory and the shared memory (124). Other communication mechanisms may be used to transfer data between the various shared memories without departing from the invention.

The GPUs (126) are a type of processors that includes a significantly larger number of cores than the processor (122) discussed above. The GPUs (126) may utilize the cores to perform a large number of processes in parallel. The processes performed by the GPUs (126) may include basic arithmetic operations. The GPUs may perform additional types of processes without departing from the invention.

In one or more embodiments of the invention, the GPUs (126) include computing resources that allow the GPUs to perform the functions described throughout this application. The computing resources (not shown) within the GPUs may include cache, local memory (e.g., dynamic random access memory (DRAM)), and the cores discussed above. The cores may be capable of processing one or more threads (e.g., processes performed on data by a core of the GPU) at a time and temporarily storing data in the cache and/or local memory during the processing. A thread is a process performed on data by a core of the GPUs (126).

In one or more embodiments of the invention, the host computing device (100) operates using a host operating system (OS) (110). The host OS (110) is an operating system that manages the operation of the client VMs (102), the specialized VMs (104), and the hardware layer (120). The host OS (110) may service requests obtained from one or more of the client VMs (102). In one or more embodiments of the invention, the host OS (110) services the requests by assigning tasks to the specialized VMs (104) based on the requests. In one or more embodiments of the invention, the host OS (110) services the requests via the method illustrated in FIG. 2.

In one or more embodiments of the invention, the host OS (110) is implemented as computer instructions, e.g., computer code, stored on a persistent storage that when executed by a processor(s) (e.g., 122) of the host computing device (100) cause the host computing device (100) to provide the functionality of the host OS (110) described throughout this application.

In one or more embodiments of the invention, the host OS (110) includes an offload component (112) that serves as an interface between the host OS (112) and the specialized VMs (104). The offload component (112) may send requests, updates, and/or any other type of data to one or more of the GPUs (126). In one or more embodiments of the invention, the offload component is implemented as, for example, an application programming interface (API). The offload component (112) may further include functionality that allows the offload component (112) to communicate with operating systems of each of the specialized VMs (104).

In one or more embodiments of the invention, the offload component (112) is implemented as computer instructions, e.g., computer code, stored on a persistent storage that when executed by a processor(s) (e.g., 122) of the host computing device (100) cause the host computing device (100) to provide the functionality of the offload component (112) described throughout this application.

Figure 4:
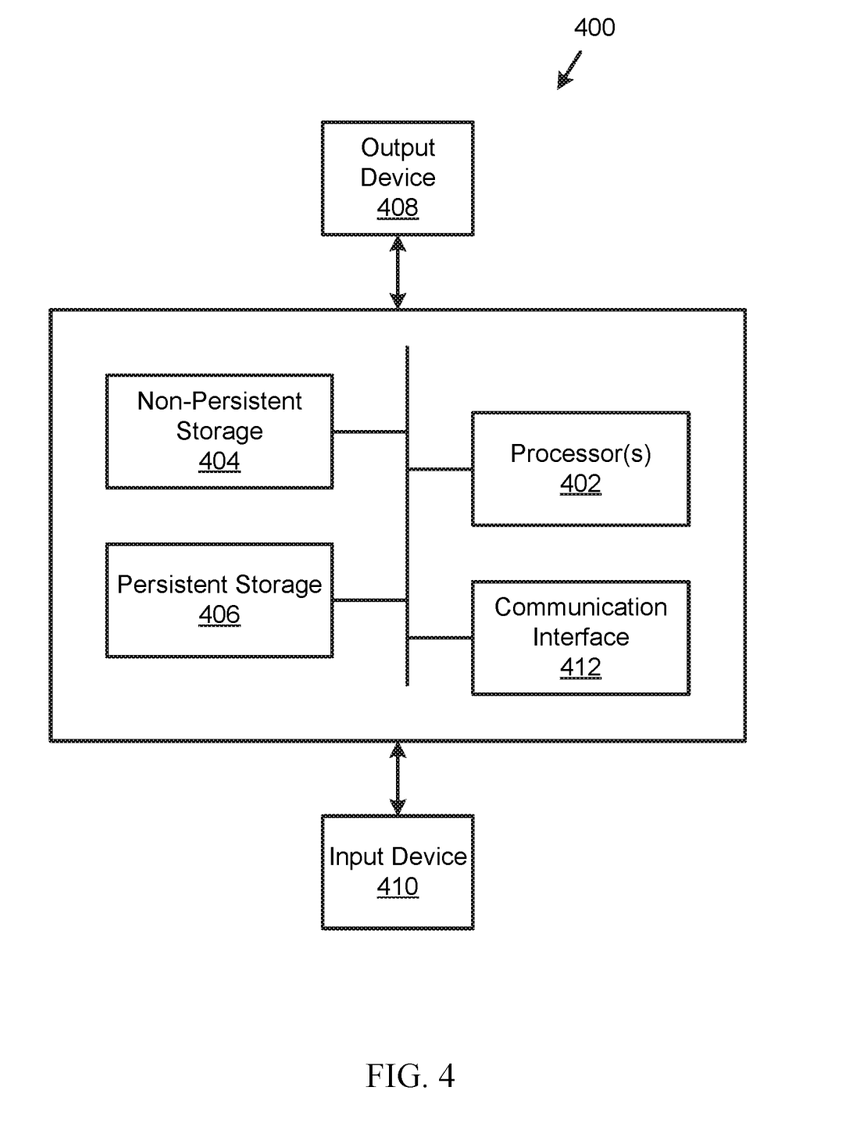
FIG. 4 shows a diagram of a computing device in accordance with one or more embodiments of the invention.

In one or more embodiments of the invention, the host computing device (100) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host computing device (100) described throughout this application.

In one or more embodiments of the invention, the backup storage device (150) stores data. The data may be processed data obtained from the host computing device (100). The backup storage device (150) may include multiple disks (e.g., hard disk drives, solid state drives, etc.). Each disk may store all or a portion of the data. In one or more embodiments of the invention, the backup storage device (150) includes persistent storage (also referred to as stable storage). Persistent storage is non-volatile storage that may retain data even when no power is supplied to the non-volatile storage.

In one or more embodiments of the invention, the backup storage device (150) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device (150) described throughout this application.

In one or more embodiments of the invention, the backup storage device (150) is implemented as a logical device. The logical device may utilize the computing resources of any number of computing devices and thereby provide the functionality of the backup storage device (150) described throughout this application.

In one or more embodiments of the invention, the host computing device (100) is powered by a primary power source (160). In one or more embodiments of the invention, the power source (160) may provide power (which may be AC or DC power) to the components of the host computing device (100) such as, for example, the hardware layer (120). The primary power source (160) may include functionality for powering the host computing device (160) for extended periods of time.

In one or more embodiments of the invention, when the host computing device (160) is to be powered down, the host computing device (100) switches obtaining power from the primary power source (160) to the secondary power source (162). During a power down, the host computing device (100) may have a limited amount of time before power is no longer supplied to the host computing device (100). In one or more embodiments of the invention, after the host computing device (100) loses power, any data stored in the host OS memory (128) and/or the shared memory (124) may be lost.

In one or more embodiments of the invention, the power down may be caused by a variety of factors. The factors may be, for example, low power available from the primary power source (160), a loss of connection between the primary power source (160) and the host computing device (100), a detection of overheating by a component of the hardware layer (120), by a request from a client VM (102), and/or any other factors without departing from the invention. During the power down, any or all data stored in the host OS memory (128) may be sent to the backup storage device (150) in order to avoid losing the data. Prior to the transfer, all or a portion of the data may be processed by one or more GPUs (126). The processing may be performed in accordance with FIG. 2.

In one or more embodiments of the invention, the primary power source (160) is a physical device. The physical device may be a device that stores power and provide power to other components (e.g., the host computing device (100) via wired and/or wireless connections. The physical device may be, for example, a battery, a power plant connected to the host computing device via a power outlet, and/or any other types of power source without departing from the invention.

In one or more embodiments of the invention, the secondary source (162) is a device that provides limited power to the host computing device (100). The power provided may be limited by time. In other words, the power provided to the host computing device (100)) by the secondary power source (162) may be for a significantly shorter amount than that of the primary power source (160).

In one or more embodiments of the invention, the secondary power source (162) is a physical device. The physical device may be a device that stores power and provide power to other components (e.g., the host computing device (100)) via wired and/or wireless connections. The physical device may be, for example, a battery, a capacitor, a power plant connected to the host computing device via a power outlet, and/or any other types of power source without departing from the invention.

While FIG. 1 shows the architecture of the host computing device, the invention is not limited to the architecture shown in FIG. 1.

Figure 2:
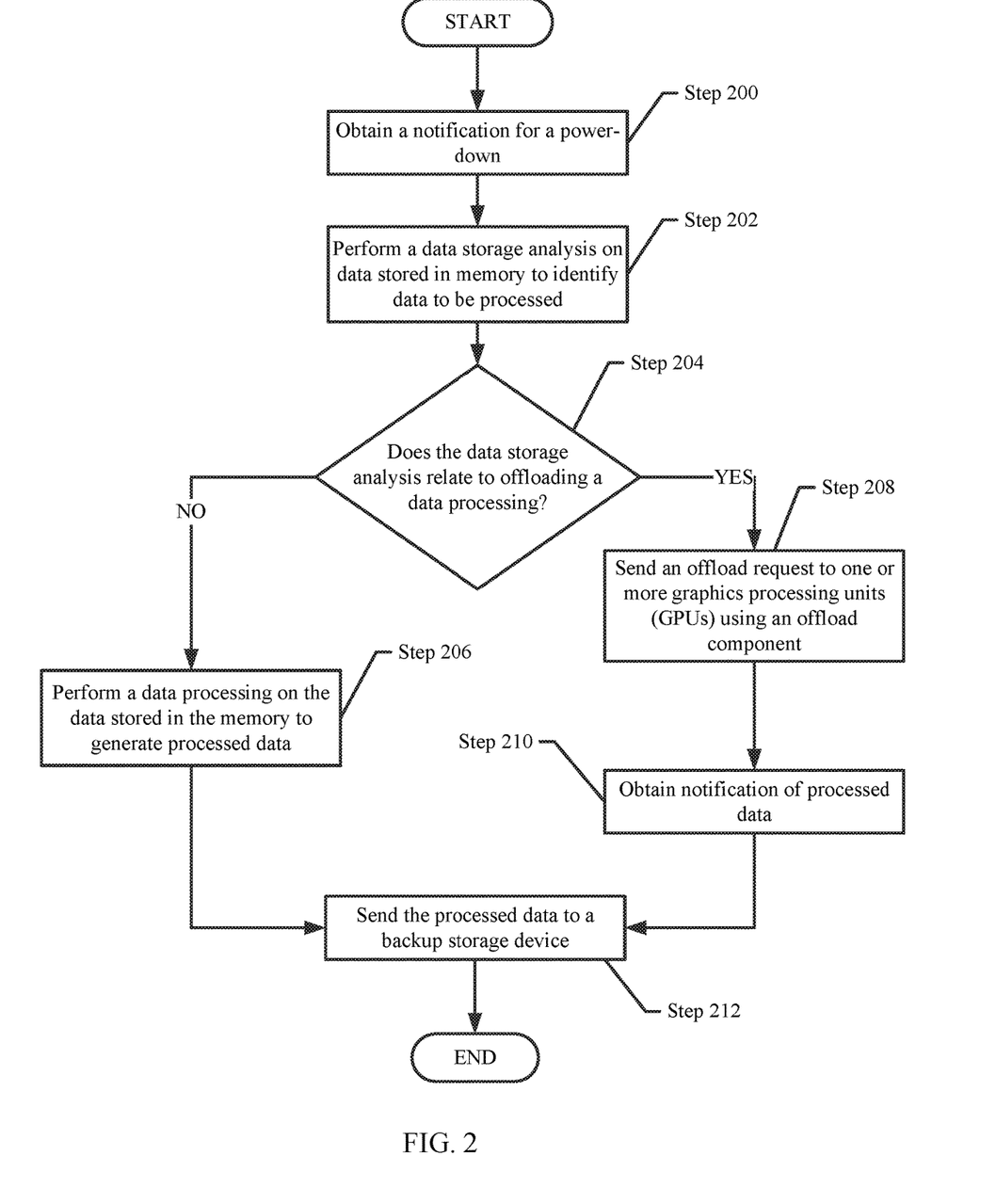
FIG. 2 shows a flowchart for managing client requests in accordance with one or more embodiments of the invention.

FIG. 2 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2 may be performed in parallel with any other steps shown in FIG. 2 without departing from the scope of the invention.

FIG. 2 shows a flowchart for performing a backup operation in accordance with one or more embodiments of the invention. The method shown in FIG. 2 may be performed by, for example, a host OS (110, FIG. 1). Other components of the system illustrated in FIG. 1 may perform the method of FIG. 2 without departing from the invention.

Turning to FIG. 2, in step 200, a notification for a power down is obtained. In one or more embodiments of the invention, the notification may be obtained from the primary power source. The notification may specify that a transfer of power supply from the primary power source to the secondary power source has occurred.

In one or more embodiments of the invention, the notification may specify a cause for the power down. The cause may be any of the factors discussed in FIG. 1 (e.g., overheating of a component in the hardware layer, lack of available power in the primary power source, a request from a client VM to initiate a power down) and/or any other factor without departing from the invention.

In step 202, a data storage analysis is performed on data stored in host OS memory to identify data to be processed. In one or more embodiments of the invention, the data storage analysis includes analyzing the data, identifying characteristics of the data, and determining, based on the characteristics, whether any or all of the data is to be processed prior to transferring the data to stable storage (e.g., the backup storage device).

The characteristics of the data include, for example, a data size (e.g., how much data is stored in the host OS memory), a type of data (e.g., a file, objects, etc.), any metadata associated with the data (e.g., file metadata), and/or any other characteristics without departing from the invention. The host OS may analyze the characteristics to determine a predicted time period it would take to process the data and store it in stable storage. The predicted time period may be based on the size of the data, the type of processing to be performed, and the processing speed of the processor of the host OS. The host OS may compare the predicted time period to a remaining time before power down is complete.

If the predicted time period is greater than the remaining time, the host OS may determine that offloading is required. Conversely, if predicted time period is less than the remaining time, the host OS may determine that offloading is not required.

In one or more embodiments of the invention, the type of processing that may be performed on the data may be any combination of compression algorithms (discussed below), data integrity field (DIF) calculations (discussed below), and/or any other type of processing without departing from the invention.

In one or more embodiments of the invention, the type of processing performed on the data may depend on the type of data. For example, a file of one format may allow the compression algorithm to be performed, but a file of a second format may not allow the compression algorithm to be performed. The type of processing expected to be performed on the data (or on each portion of the data), may affect the calculation of the processing speed. For example, a type of processing that requires large processing may be associated with a slower processing speed. Conversely, a type of processing that requires small processing may be associated with a faster processing speed.

In step 204, a determination is made about whether the data storage analysis relates to offloading a data processing of the data in the host OS memory. If the data storage analysis relates to offloading a data processing of the data in the host OS memory, the method proceeds to step 208; otherwise, the method proceeds to step 206.

In step 206, data processing is performed on the data stored in the host OS using a processor of the host computing device to generate processed data. In one or more embodiments of the invention, the data processing is performed by performing a series of processing tasks. Examples of processing tasks that may process data include applying or performing lossless or lossy compression algorithms, deduplication operations, redundant array of independent disks (RAID) parity calculations, data integrity calculations (e.g., cyclic redundancy check (CRC)), and/or any other tasks without departing from the invention.

In one or more embodiments of the invention, the processing tasks may be performed in parallel. In other words, the processing capabilities of the processing units performing the data processing may allow for multiple processes to be performed. In such a scenario, the data in the host OS memory may be divided such that the multiple cores of the processing units can each perform the processing task of a portion of the data in parallel.

In one or more embodiments of the invention, a lossless compression algorithm is an algorithm that encodes portions of data (i.e., a file) wherein the encoded portions take up less data than the original portions for the purpose of reducing the total amount of data used by the file. The files that have undergone lossless compression may be restored to the original data through decoding the encoded portions. Examples of lossless compression algorithms include a Lempel-Ziv-Markov chain algorithm (LZMA), run-length encoding (RLE), and/or other types of compression without departing from the invention.

In one or more embodiments of the invention, the data integrity calculations are calculations performed for the purpose of protecting the data and ensuring data integrity after the data is stored. Data integrity may be a measurement of the consistency of data during the generation, storage, and recovery of the data. Data integrity may be monitored using, for example, a data integrity field (DIF). A DIF is additional data included in original data for data protection purposes during storage. The DIF may include adding an 8-byte extension to a 512-byte disk. The data in the 8-byte extension may include additional metadata and/or protection tags. The additional 8-byte extension may be used to check the data integrity of the stored data to determine proper storage of the data.

In step 208, after determining to offload processing in step 204, the host OS sends an offload request to one or more graphics processing units (GPUs) using an offload component. In one or more embodiments of the invention, the offload component obtains the request to offload the data processing and converts the request to a format readable to the GPUs. The converted request (i.e., the offload request) may be subsequently sent to the GPUs. In one or more embodiments of the invention, the offload request specifies a series of processing tasks to be performed when processing the data. In one or more embodiments of the invention, the GPUs process the data in accordance with the offload request.

In addition to the offload request, the host OS, via the processor, initiates a transfer of the data from the host OS memory to the shared memory to allow the GPUs to access the data for processing. The offload request may specify a storage location (e.g., logical address, physical offset and range, etc.) of the portions of data in the shared memory that are to be processed.

In step 210, after the GPU(s) have completed the data processing, a notification of the completed data processing is obtained by the host OS. In one or more embodiments of the invention, the notification is sent from a GPU that obtained the offload request in step 208. The offload component may convert the notification to a readable format for the host OS. The notification may specify that the processed data is stored in the shared memory. Further, the notification may include addresses for the processed data that the host OS may use to retrieve the processed data.

In step 212, the processed data is sent to a backup storage device. In one or more embodiments of the invention, the host OS utilizes computing resources (e.g., a processor) of the hardware layer of the host computing device to send the processed data to the stable storage.

EXAMPLE

Figure 3:
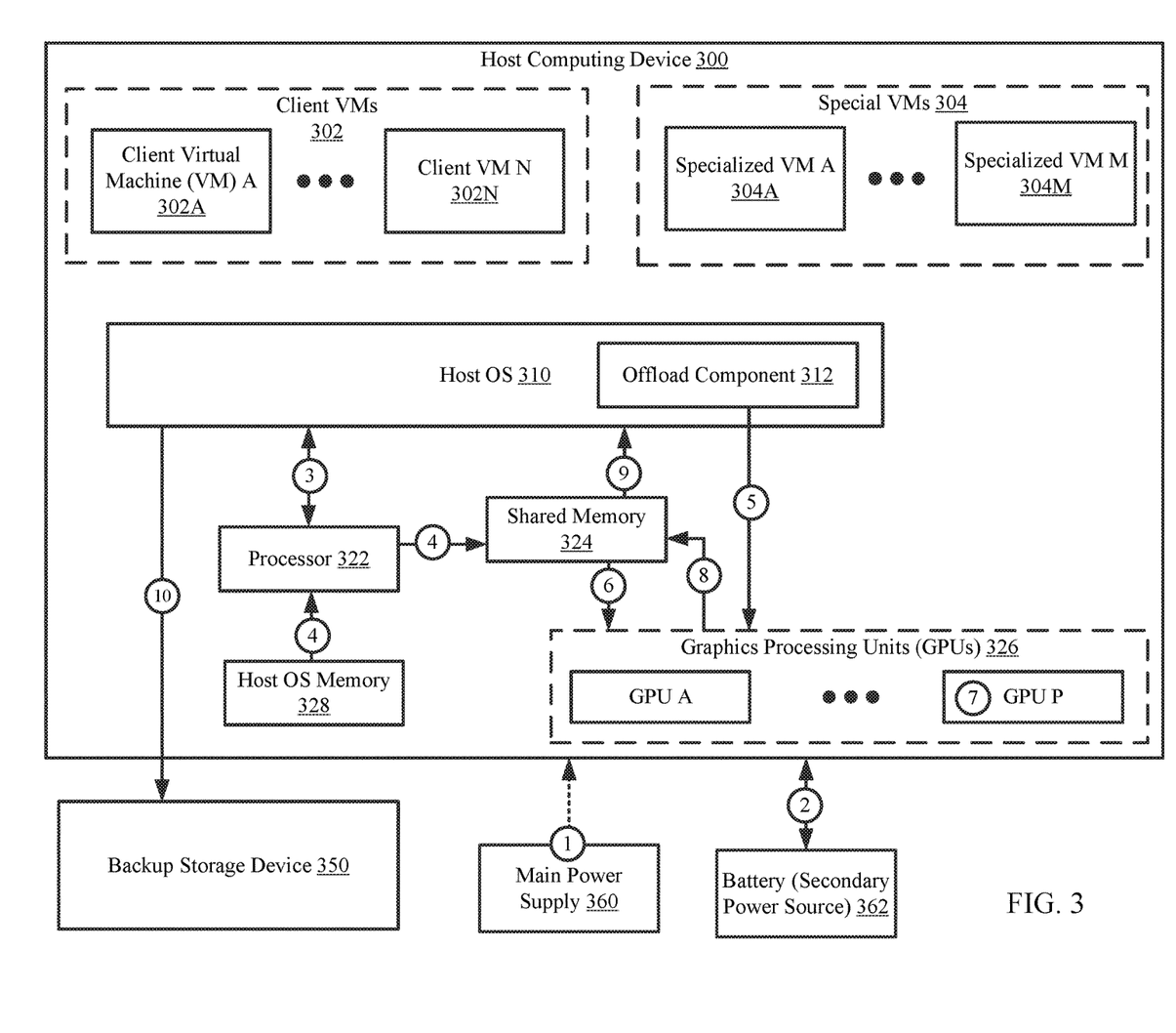
FIG. 3 shows an example in accordance with one or more embodiments of the invention.

The following section describes an example. The example, illustrated in FIG. 3, is not intended to limit the invention. Turning to the example, consider a scenario in which a host computing device (300) undergoes a power down.

FIG. 3 shows an example system. The example system includes a host computing device (300), a backup storage device (350), a main power supply (360), and a secondary power supply (362).

The main power supply is connected to the host computing device (300) via a power outlet. The secondary power source is a battery attached to a hardware layer of the host computing device (300). At a later point in time, the connection between the main power supply (360) and the host computing device (300) is lost [1]. The loss of power from the main power supply (360) results in a transfer of power supply to the battery (362) [2]. The transfer of power initiates a power down.

A host OS (310) operating in the host computing device is notified of the power down. Based on the notification, the host OS (310) performs a data storage analysis on the data stored in the host OS memory (328) [3]. The data storage analysis includes identifying the size of the data (e.g., one terabyte (TB) of data), identifying a type of data, determining that compression and DIF calculations may be performed on the data, and determining that the processing speed of the processor (322) and the size of the data to be processed may take a longer amount of time than the amount of time provided by the battery (362) before the battery runs out of power.

Based on the determination, the host OS (310), via the processor (322), stores the one TB of data in a shared memory (324) accessible to GPUs (326) operating on the host computing device (300) [4].

Further, the host OS (310), based on the data storage analysis, determines that the processing may be offloaded to the GPUs. The host OS (310), via an offload component operating on the host OS (310), sends an offload request to the GPUs that specify processing the data in the shared memory (324) that was transferred from the host OS memory (328) [5]. The offload request specifies performing a RLE compression algorithm on all of the data to obtain compressed data and to perform DIF calculations on 8-byte portions of the pre-compressed data to obtain additional metadata to be used to determine the integrity of the data storage of each of the 8-byte portions. The offload request further specifies the storage location of the data in the shared memory (324).

The GPUs (326), in response to the offload request, obtain the requested data from the shared memory (324) [6]. The GPUs (326) process the obtained data in accordance with the processing tasks specified in the offload request [7]. After processing the data, the GPUs (326) store the processed data in the shared memory (324) [8].

The host OS (310) obtains a notification of the processed data that specifies the storage location (i.e., addresses) of the processed data. The host OS (310) uses the addresses to obtain the processed data [9]. The host OS (310) stores the data in the backup storage device (350) [10]. The host OS (310) utilizes the processor (322) to send the processed data to the backup storage device.

End of Example

While the above description of the invention has been described with respect to GPUs, embodiments of the invention may be implemented using any other type of processing unit. The processing unit may include specialized processing hardware, non-specialized processing hardware, and temporary storage (e.g., volatile memory).

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the delegation of performing specific operations during a power down by a computing device with multiple processors each with varying capabilities. During the power down, a large amount of data may be stored in volatile memory of the computing device.

A computing device may include a processor (e.g., a CPU) that may be suited to perform a portion of data processing that involves a small number of complex computations. The data processing may include performing large numbers of simple, arithmetic calculations. The data processing may take a considerably longer amount of time than is permitted during a power down, after which all data stored in volatile memory will be lost. Embodiments of the invention may offload the large number of simple calculations to graphics processing units. Because the GPUs include a larger number of processing cores compared to a CPU, the GPU may be suited to more quickly complete the larger number of simple calculations, thus reducing the risk of losing data.

Thus, embodiments of the invention may address the problem of inefficient use of computing resources. This problem arises due to the technological nature of the environment in which data processing is performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing data, the method comprising:
obtaining, by a host operating system (OS) on a host computing device, a notification of a power down; and
in response to the notification:
performing a data storage analysis on data stored in host OS memory to identify a plurality of processing tasks to perform on the data;
making a first determination, based on the data storage analysis, that data processing is to be offloaded to a graphics processing unit; and
in response to the first determination:
sending a data processing request to the processing unit;
obtaining a second notification associated with processed data from the graphics processing unit; and
storing, in response to the second notification, the processed data in a backup storage device,
obtaining, by the host operating system, a third notification of a power down; and
in response to the third notification:
performing a second data storage analysis on second data stored in the memory to identify a second series of processing tasks to perform on the second data;
making a second determination, based on the second data storage analysis, that a second data processing is to be performed by the host computing device;
in response to the second determination:
performing a data processing on the second data to generate second processed data; and
storing the second processed data in the backup storage device.

2. The method of claim 1, further comprising:
prior to sending the data processing request, transferring the data from the memory to a shared memory.

3. The method of claim 2, wherein the graphics processing unit can access the shared memory, and wherein the graphics processing unit cannot access the host OS memory.

4. The method of claim 1, wherein the host OS memory comprises volatile memory, and wherein the backup storage device comprises non-volatile storage.

5. The method of claim 1, wherein the offload request is issued by an offload component executing in the host OS.

6. The method of claim 1, wherein the notification is based on a transfer of power supply to the host computing device from a primary power source to a secondary power source.

7. The method of claim 1, wherein at least one processing task of the plurality of processing tasks comprises compression and a data integrity calculation.

8. A non-transitory computer readable medium comprising computer readable program code, which when executed by a computer processor enables the computer processor to perform a method for processing data, the method comprising:
obtaining, by a host operating system (OS) on a host computing device, a notification of a power down; and
in response to the notification:
performing a data storage analysis on data stored in host OS memory to identify a plurality of processing tasks to perform on the data;
making a first determination, based on the data storage analysis, that a data processing is to be offloaded to a graphics processing unit;
in response to the first determination:
sending a data processing request to the processing unit;

obtaining a second notification associated with processed data from the graphics processing unit; and
storing, in response to the second notification, the processed data in a backup storage device,
obtaining, by the host operating system, a third notification of a power down; and
in response to the third notification:
performing a second data storage analysis on second data stored in the memory to identify a second series of processing tasks to perform on the second data;
making a second determination, based on the second data storage analysis, that a second data processing is to be performed by the host computing device; and
in response to the second determination:
performing a data processing on the second data to generate second processed data; and
storing the second processed data in the backup storage device.

9. The non-transitory computer readable medium of claim 8, further comprising:
prior to sending the data processing request, transferring the data from the memory to a shared memory.

10. The non-transitory computer readable medium of claim 9, wherein the graphics processing unit can access the shared memory, and wherein the graphics processing unit cannot access the host OS memory.

11. The non-transitory computer readable medium of claim 8, wherein the host OS memory comprises volatile memory, and wherein the backup storage device comprises non-volatile storage.

12. The non-transitory computer readable medium of claim 8, wherein the offload request is issued by an offload component executing in the host OS.

13. The non-transitory computer readable medium of claim 8, wherein the notification is based on a transfer of power supply to the host computing device from a primary power source to a secondary power source.

14. The non-transitory computer readable medium of claim 8, wherein at least one processing task of the plurality of processing tasks comprises compression and a data integrity calculation.

15. A system, comprising:
a processor;
a plurality of graphics processing units;
a host operating system (OS) executing on the processor;
host OS memory;
shared memory; and
wherein the host operating system is programmed to:
obtain a notification of a power down; and
in response to the notification:
perform a data storage analysis on data stored in the host OS memory to identify a plurality of processing tasks to perform on the data;
make a first determination, based on the data storage analysis, that a data processing is to be offloaded to at least one of the plurality of graphics processing unit; and
in response to the first determination:
send a data processing request to the processing unit;
obtain a second notification associated with processed data from the graphics processing unit;
store, in response to the second notification, the processed data in a backup storage device,
obtain a third notification of a power down; and
in response to the third notification:
perform a second data storage analysis on second data stored in the memory to identify a second series of processing tasks to perform on the second data;
making a second determination, based on the second data storage analysis, that a second data processing is to be performed by the host computing device; and
in response to the second determination:
performing a data processing on the second data to generate second processed data; and
storing the second processed data in the backup storage device,
wherein the host OS memory comprises volatile memory, and wherein the backup storage device comprises non-volatile memory.

16. The system of claim 15, further comprising:
prior to sending the data processing request, transferring the data from the memory to the shared memory,
wherein the processing unit can access the shared memory, and
wherein the plurality of graphics processing units cannot access the host OS memory.

17. The system of claim 15, wherein at least one processing task of the plurality of tasks comprises compression and a data integrity calculation.

18. The system of claim 15, wherein the notification is based on a transfer of power supply to the host computing device from a primary power source to a secondary power source.

* * * * *